(12) United States Patent
Phaal

(10) Patent No.: US 9,509,583 B2
(45) Date of Patent: Nov. 29, 2016

(54) METHOD FOR ASYNCHRONOUS CALCULATION OF NETWORK TRAFFIC RATES BASED ON RANDOMLY SAMPLED PACKETS

(71) Applicant: InMon Corp., San Francisco, CA (US)

(72) Inventor: Peter Phaal, San Francisco, CA (US)

(73) Assignee: InMon Corp., San Francisco, CA (US)

( * ) Notice: Subject to any disclaimer, the term of this patent is extended or adjusted under 35 U.S.C. 154(b) by 177 days.

(21) Appl. No.: 14/162,489

(22) Filed: Jan. 23, 2014

(65) Prior Publication Data

US 2014/0204786 A1 Jul. 24, 2014

Related U.S. Application Data

(60) Provisional application No. 61/756,367, filed on Jan. 24, 2013.

(51) Int. Cl.
*H04L 12/26* (2006.01)

(52) U.S. Cl.
CPC ......... *H04L 43/0894* (2013.01); *H04L 43/022* (2013.01)

(58) Field of Classification Search
None
See application file for complete search history.

(56) References Cited

U.S. PATENT DOCUMENTS

| | | | |
|---|---|---|---|
| 4,922,488 A | 5/1990 | Niestegge | |
| 5,256,958 A | 10/1993 | Eng et al. | |
| 5,615,323 A | 3/1997 | Engel et al. | |
| 5,790,799 A | 8/1998 | Mogul | |
| 5,982,753 A | 11/1999 | Pendleton et al. | |
| 6,085,243 A | 7/2000 | Fletcher et al. | |
| 6,108,782 A | 8/2000 | Fletcher et al. | |
| 6,308,148 B1 | 10/2001 | Bruins et al. | |
| 6,356,532 B1 | 3/2002 | Richardson et al. | |
| 6,425,015 B1 | 7/2002 | Jennings et al. | |
| 6,473,400 B1 | 10/2002 | Manning | |
| 6,529,475 B1 | 3/2003 | Wan et al. | |
| 6,587,878 B1 | 7/2003 | Merriam | |
| 6,724,729 B1 | 4/2004 | Sikdar | |
| 6,785,286 B1 | 8/2004 | O'Keeffe et al. | |
| 6,886,102 B1 | 4/2005 | Lyle | |
| 6,894,972 B1 | 5/2005 | Phaal | |
| 6,977,895 B1 * | 12/2005 | Shi | H04L 12/5693 370/235 |
| 7,164,657 B2 | 1/2007 | Phaal | |
| 2001/0055274 A1 | 12/2001 | Hegge et al. | |
| 2007/0076606 A1 * | 4/2007 | Olesinski | H04L 41/0893 370/230 |
| 2012/0297083 A1 | 11/2012 | Ferguson et al. | |
| 2015/0089045 A1 | 3/2015 | Agarwal et al. | |
| 2015/0281085 A1 | 10/2015 | Phaal | |

OTHER PUBLICATIONS

Brownlee "Traffic Flow Measurement: Meter MIB," Network Working Group RFC 2064, pp. 1-38 (Jan. 1997).

(Continued)

*Primary Examiner* — Kwang B Yao
*Assistant Examiner* — Juvena Loo
(74) *Attorney, Agent, or Firm* — Kilpatrick Townsend & Stockton LLP

(57) ABSTRACT

A method for calculating rates based on random sampling includes updating at least one state variable when sampled information is received. The method further includes calculating a rate value based on the state variable and the elapsed time since the state variable was previously updated.

18 Claims, 3 Drawing Sheets

(56) References Cited

OTHER PUBLICATIONS

Claffy et al. "Application of Sampling Methodologies to Network Traffic Characterization," SIGCOMM '93 Conference proceedings on Communications architectures, protocols and applications, pp. 194-203 (Oct. 1993).

Phaal "Pragmatic software defined networking," available at http://blog.sflow.com/2013/03/pragmatic-software-defined-networking.html (Mar. 31, 2013).

U.S. Appl. No. 14/229,691, Non-Final Office Action, Sep. 22, 2016, 16 pages.

* cited by examiner

METHOD FOR ASYNCHRONOUS CALCULATION OF NETWORK TRAFFIC RATES BASED ON RANDOMLY SAMPLED PACKETS

CROSS-REFERENCES TO RELATED APPLICATIONS

The present application claims benefit under 35 USC 119(e) of U.S. provisional application No. 61/756,367, filed Jan. 24, 2013, entitled "METHOD FOR ASYNCHRONOUS CALCULATION OF NETWORK TRAFFIC RATES BASED ON RANDOMLY SAMPLED PACKETS", the contents of which is incorporated herein by reference in its entirety.

The present application is related to U.S. Pat. No. 6,894,972, entitled "INTELLIGENT COLLABORATION ACROSS NETWORK SYSTEM", and U.S. Pat. No. 7,164,657, entitled "INTELLIGENT COLLABORATION ACROSS NETWORK SYSTEMS", the contents of which are incorporated herein by reference in their entirety.

BACKGROUND OF THE INVENTION

The present invention relates to a network monitoring system and method for asynchronous calculation of network traffic rates based on randomly sampled packets.

U.S. Pat. Nos. 6,894,972 and 7,164,657 discuss that prior art approaches of checking whether a packet belongs to a particular class of traffic can be expensive in terms of network resources and/or equipment costs. In addition, one prior art approach such as Cisco's Netflow™ monitoring system also suffers from delay problems.

A packet switching network such as the Internet includes multiple nodes connected together by multiple transmission links for transporting information in packet form from one or more source nodes to one or more destination nodes. A node can be a switch or a router.

Packet sampling is widely employed as a means of monitoring traffic in computer networks. The packet samples are used to estimate traffic levels (in packets per second or bits per second), based on properties identified in the packet headers, for example calculating the data rate associated with web traffic, to/from a particular network address, etc.

The current practice for analyzing sampled data is to accumulate totals over an interval, scale the result by the sampling rate, and then divide by the interval in order to report a rate (ref: Packet Sampling Basics <http://www.sflow.org/packetSamplingBasics/index.htm>).

For example, suppose network traffic is being sampled with a probability of 1/N. Further, suppose that packet per second rate is to be computed every minute, estimating the traffic from a given source address A. At the start of the minute, the set of counters is reset to zero. With each sample received a total_samples count is incremented. If the sampled packet was from host A (determined by examining the sampled packet), then a second A_samples count is also incremented. At the end of the minute, the packet rate from host A can be calculated as:

$$(A\_samples/total\_samples) * N/60$$

Important limitations of this approach to calculating rates are:
1. The rate is only available at the end of the computation interval;
2. The Nyquist frequency is double the calculation interval.

The result is a delay of up to two minutes in this example before the measurements can be reliably used to trigger actions based on the measurements. Reducing the measurement interval can improve responsiveness, but since fewer samples contribute to the smaller intervals, the accuracy of the estimates is reduced, thereby limiting the reliability of any actions.

The present invention describes a method of asynchronously analyzing packet samples (i.e., without using regularly spaced intervals) so that the speed of generating useful metrics is determined entirely by the arriving samples.

BRIEF SUMMARY OF THE INVENTION

The present invention overcomes the limitations described above and provides methods and apparatus of calculating rates associated with randomly sampled network packets. In an embodiment, a method for calculating a traffic rate value at a node based on random sampling includes sampling a packet at the node, generating a sample associated with the sampled packet, and updating at least one state variable when the sample is received. The method further includes calculating the rate value based on the state variable and an elapsed time since a state variable was previously updated.

In another embodiment, a method for calculating traffic rates of incoming packets in a node of a data network includes sampling a first packet and generating a first sample associated with the packet at the node. The method also includes receiving the sample sent from the node at a first sampling time, updating a state variable based on the received sample, and calculating a rate value at a second sampling time based on the updated state variable.

In an embodiment, the state variable is a function of the number of data packets in the data network, the size or type of the data packet and a time scaling value.

In an embodiment, the number of sampling intervals is a function of an elapsed time between the first and second sampling times and the time scaling value. In an embodiment, the first and second sampling times occur at random, i.e., at irregular time intervals.

In an embodiment, the method further includes receiving a second sample at the second sampling time and updating the state variable in response to the second received sample at the second sampling time.

In an embodiment, the updating of the state variable uses a single pole recursive low pass filter.

In yet another embodiment, a method for calculating a traffic rate includes receiving a sample at a sampling time, updating a state variable in response to the received sample, and calculating the traffic rate while the state variable is being updated.

In accordance with exemplary embodiments of the present invention, a method for calculating rates of incoming packets in a node of a network includes updating a state variable associated with a metric when a sample is received, and calculating a rate value when the metric is read.

The present invention also provides a network monitoring system including a plurality of monitor apparatuses coupled to a network and a monitor server coupled to the apparatuses. Each of the apparatuses may include a sampler module configured to randomly sample packets transiting in the network and generate samples associates tithe he sampled packets. Each of the apparatuses also includes a sample forward module configured to send the samples to the monitor server. The monitor server is configured to receive the samples at a first sampling time, update a state variable based on the received samples at a second sampling time, and calculate a rate value based on the updated state variable.

While the preferred embodiment uses a first order low pass filter, the technique can be applied to other types of filter. The preferred embodiment uses sFlow as the random packet sampling mechanism, but any other randomly sampled mechanisms may work with the present invention.

The following description, together with the accompanying drawings, will provide a better understanding of the nature and advantages of the claimed invention.

DETAILED DESCRIPTION OF THE INVENTION

This invention makes use of recent advances in network traffic monitoring. In particular, one embodiment of the invention makes use of the sFlow packet sampling technology (U.S. Pat. Nos. 6,894,972 and 7,164,657) that is widely incorporated in network equipment.

The present invention adapts the concept of digital signal processing to analyzing asynchronous data that arrives at irregular spaced time intervals. In accordance with embodiments of the present invention, a conventional first order low pass filter may be used to process periodic input values and to update state variables and calculate corresponding output values.

The low-pass filter system can be described in the following equations:
RC=time constant of the filter (in seconds)
dt=sampling period (in seconds)

filter constant $a = dt/(RC-dt)$ $$y[i] = a*x[i] + (1-a)*y[i-1]$$

where y[i] is the current output signal, x[i] is the current input signal, and y[i−1] is the previous output signal.

It is noted that the current output signal y[i] is a function of the current input signal x[i] and the previous output signal y[i−1]. In this exemplary embodiment, the filter system is an infinite-impulse-response (IIR) single-pole low-pass filter.

This filter system cannot be applied directly to random 1/N sampling of network packets since the sampled packets are not produced at regular intervals.

In accordance with the present invention, a method for calculating rates based on random sampling is split into two parts:

1. A method of updating a state variable associated with a metric when a sample is received; and 2. A method for calculating a rate when the metric is read.

According to an embodiment, the metric may be predetermined or it may change with time. The rate is calculated based on the updated state variable and an elapsed time since the state variable was previously updated.

Figure 1:
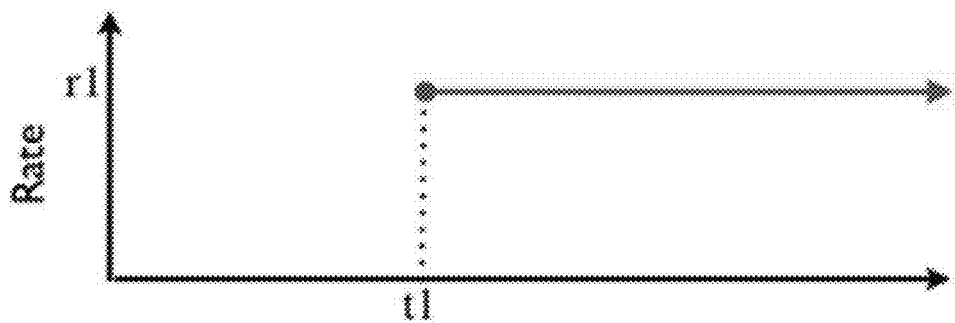
FIG. 1 is a graph showing a state variable that is updated at a sampling time t1 according to an embodiment of the present invention.

FIG. 1 is a graph illustrating an operation of setting a rate value associated with a metric at a sampling time t1 according to an embodiment of the present invention.

As shown, a random sample is received at time t1 by a node (e.g., a switch or router). The sample has an associated value v that is equal to unity ("1") if packets per second are computed, or the value v can be any other value associated with the packet, for example the size of the packet in bytes. The value can also be associated with a type of the packets such as voice, message, information or data packets. In accordance with the present invention, the state variable r1 can be set to:

$$r1 = v*N/dt \qquad (1)$$

where N is a weight or scaling factor based on the sampling probability (i.e., the denominator when expressing the sampling probability as 1 in N), v is a value associated with a packet received from a total number of packets transiting in the network, and dt is a time scaling value.

Note: in this case dt does not represent the interval between successive values, but is used to scale values to be consistent with the calculation used to read values.

FIG. 1 shows that the rate value r1 does not change once it has been set. The rate value will only change when the next packet sample is received.

Figure 2:
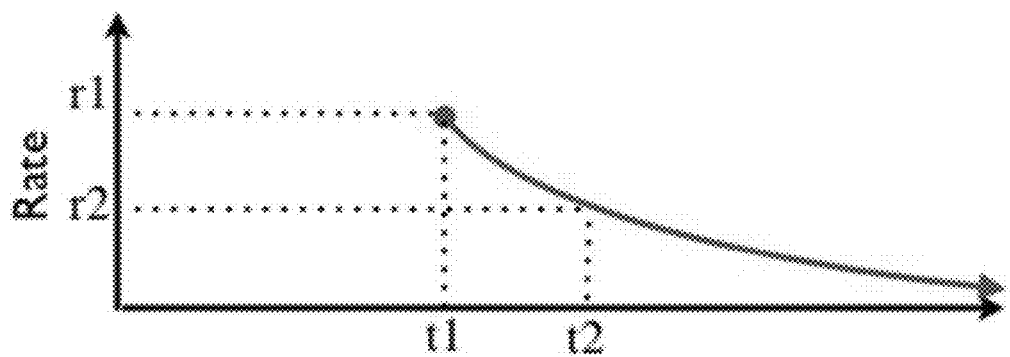
FIG. 2 is a graph showing a rate value at a sampling time t2 according to an embodiment of the present invention.

FIG. 2 is a graph showing how the rate value is calculated at a later time t2 when the rate value is read:

The number "n" of "sampling intervals" between t1 and t2 can be calculated as:

$$n = (t2-t1)/dt \qquad (2)$$

The following equation calculates the rate value that would have been generated had n zero values been applied to the digital filter in this interval:

$$r2 = r1*((1-a)^n) \qquad (3)$$

where a is the filter constant, as described above.

Equation (3) results in the exponential decay shown in FIG. 2 as the rate is read at a later time t2.

Figure 3:
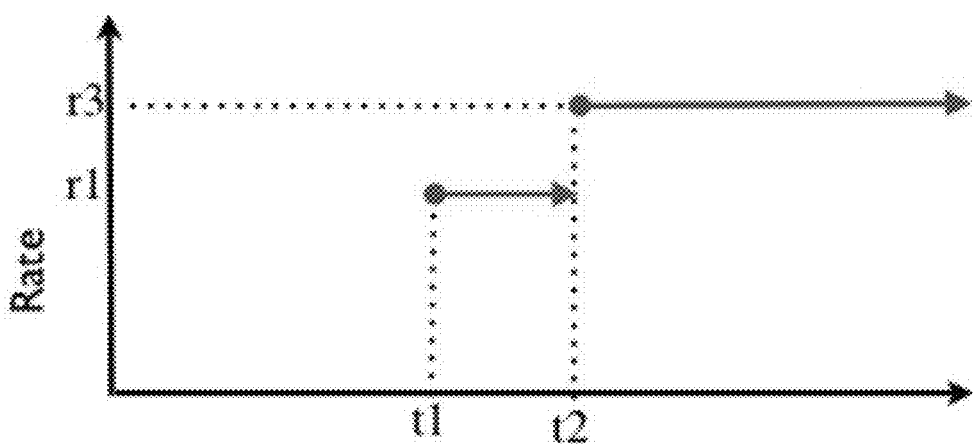
FIG. 3 is a graph showing a state variable being updated at a sampling time t2 according to an embodiment of the present invention.

FIG. 3 is a graph showing how the state variable is updated when a second sampled packet is received.

The digital filter state is updated as follows:

$$r3 = (1-a)*r2 + a*(v2*N/dt) \qquad (4)$$

where v2 is the value associated with the second sampled packet. Thus, the rate value can be recursively calculated.

Figure 4:
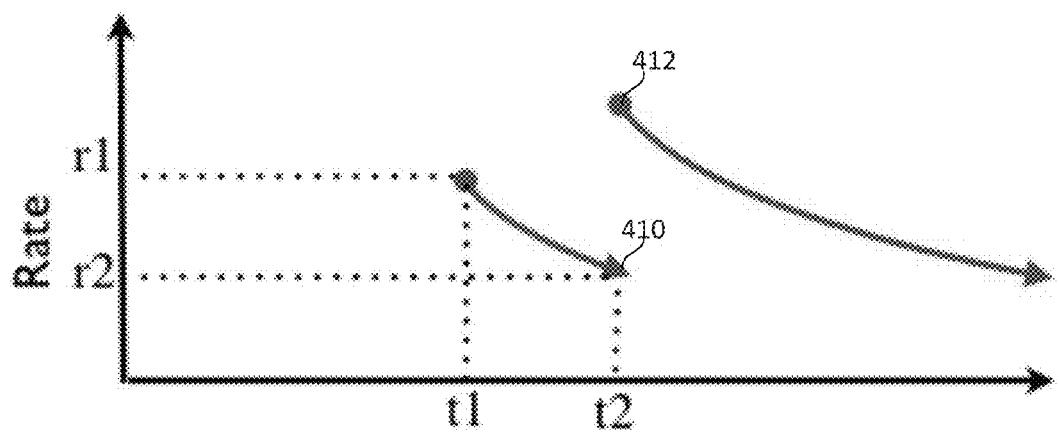
FIG. 4 is a graph showing the output of the rates at different times according to an embodiment of the present invention.

FIG. 4 is a graph showing how the rate values appear when read over time. As shown, a rate value 412 (e.g., r3 in Equation (4)) is updated based on the state variable 410 (r2) at time t2.

Figure 5A:
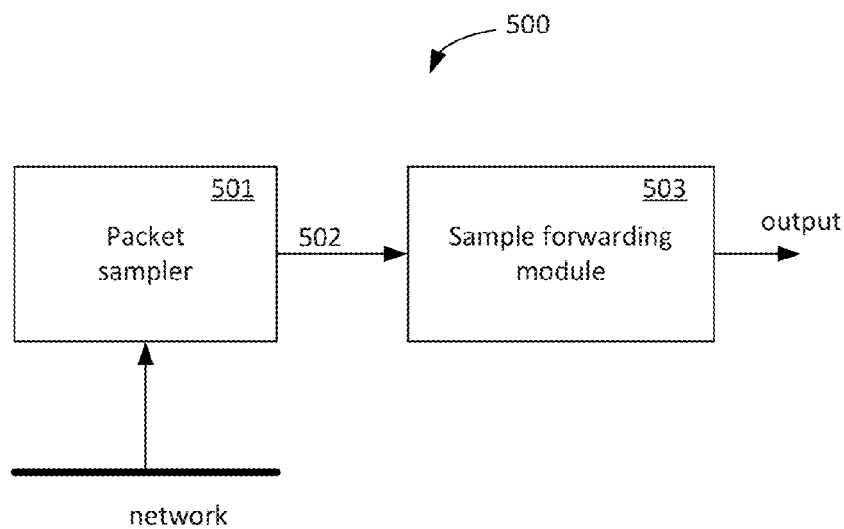
FIG. 5A is a simplified schematic block diagram showing an apparatus for calculating rates according to an embodiment of the present invention.

FIG. 5A is a simplified schematic block diagram of an apparatus 500 configured to randomly sample packets transiting in a network according to an exemplary embodiment of the present invention. Apparatus 500 includes a packet sampler 501 coupled to a data or a computer network and a sample forwarding module 503. Packet sampler 501 is configured to randomly sample packets that transit the network. In an embodiment, packet sampler 501 samples a first sample at a sampling time. The first sample may be a voice packet, a message packet, a data or information packet that is present in the network. In an embodiment, the first sample may be a part of a packet or an entire packet. Sample forwarding module 503 is coupled to packet sampler 501 and configured to receive samples 502 from packet sampler 501. Samples 502 may contain information data relating to original packet lengths, packet types, the total number of samples taken, the total number of packets from which samples were taken, source/destination prefix, next hop address, etc. Sample forwarding module 503 then sends samples 502 to a remote server for analysis. Handling analysis off to the remote server reduces the cost of the node (switch, router) of the network. The remote server will be described in detail below.

In an embodiment, sampler 501 and sample forwarding module 503 can be an application specific integrated circuit (ASIC). In another embodiment, apparatus 500 can be a network processor, a switching/routing ASIC, or a general purpose network processor having a memory that can be implemented on-chip because the present invention does not require a large size memory with the use of a first order low-pass filter or an IIR filter.

In an embodiment, apparatus 500 can be integrated in agents (210-250) as shown in FIG. 2 of U.S. Pat. Nos. 6,894,972 and 7,164,657, the contents of which are incorporated herein in their entirety. FIG. 2 of U.S. Pat. Nos. 6,894,972 and 7,164,657 is reproduced as FIG. 5B herein for the sake of clarity.

Figure 5B:
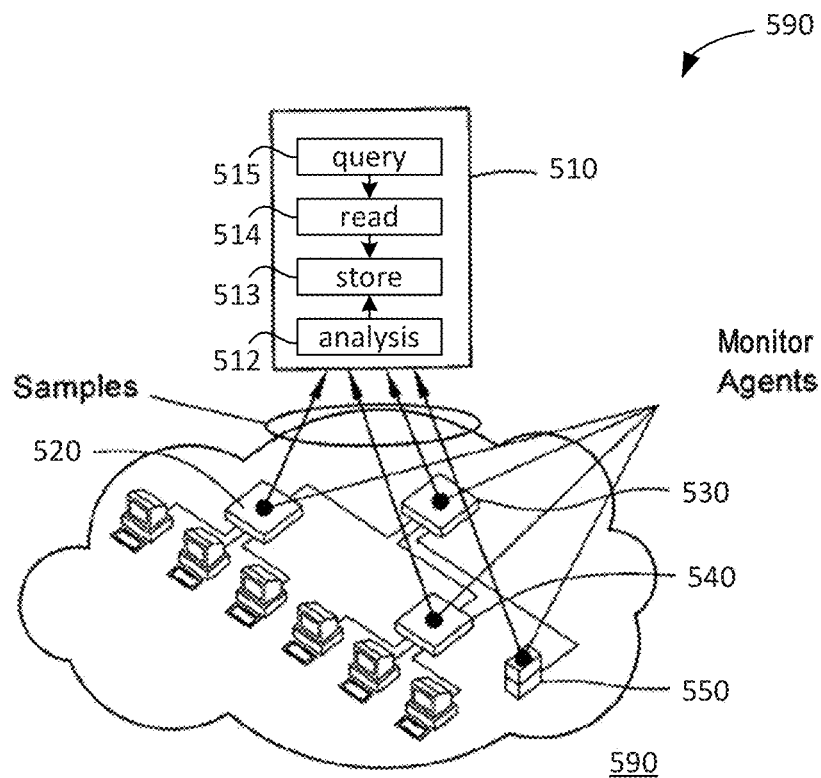
FIG. 5B is a simplified network monitoring system according to an embodiment of the present invention.

FIG. 5B is a simplified network monitoring system 590 according to an exemplary embodiment of the present invention. Monitoring system 590 includes a monitor server 510 connected to a plurality of monitor agents 520, 530, 540, 550. Each of the nodes associated with monitor agents 520, 530, 540, 550 performs as a switch or router between different network segments. According to the present invention, each of these monitor agents 520, 530, 540, 550 includes one or more apparatuses 500 shown in FIG. 5A that sample packets of the corresponding network segments. Each of these monitor agents (a.k.a. sFlow agents) 520, 530, 540, 550 sends information data associated with the sampled packets to monitor server 510. Monitor server 510 receives information data from monitor agents 520, 530, 540, 550 and performs traffic analysis. Performing remote analysis using a monitor server reduces the hardware cost of apparatus 500. According to a preferred embodiment of the present invention, monitor agents 520, 530, 540, and 550 each may include apparatus 500 for randomly sampling packets in the network and forwarding information data associated with the randomly sampled packets to monitor server 510.

Monitor server 510 receives information data from each of the monitor agents and performs traffic analysis. In an embodiment, monitor server 510 includes an analysis module 512 and a storage module 513. Analysis module 512 may include a communication interface block (not shown) adapted to communicate with the monitor agents and to handle network traffic of system 590. Analysis module 512 receives sample information sent by sample forwarding module 513, updates a state variable based on the received sample information and calculates a rate value based on the updated state variable. The state variable may be calculated with Equations (1) through (4). In an embodiment, apparatus may perform the rate calculation and send the rate value to monitor server 510 for storage and retrieval.

Storage module 513 is adapted to store traffic data associated with the connected monitor agents. In an embodiment, only the value of the state variable and the time that it was last updated are stored, so that a small data storage is required. The updated rate value can be used to drive actions at the instant it is updated, resulting in low latency response to changing rates. This architecture is very useful since the rate can be generated quickly and can be compared against a threshold to generate very fast notifications or trigger actions. For example, the rate can be used to trigger actions that reconfigure the network to remove or accommodate the traffic, such as eliminating a denial of service attack, or rerouting traffic to take a less busy path.

According to an embodiment, monitor server 510 further includes a read module 514 and a query module 515. In one example, a user may retrieve data (e.g., traffic rates, network performance associated with a certain monitor agent) from monitor server 510 through query module 515, which forwards user's requests to read module 514 for retrieving data in store module 513. It should be noted that, in some embodiment, monitor agents 520, 530, 540, and 550 may perform data analysis and send the results to monitor server 510 for storage and retrieval. In other embodiments, the monitor agents may also perform time-based sampling or polling of the associated node (switch, router) to inquire the interface statistics and send the collected statistics to the monitor server for reporting and analysis.

According to an embodiment, monitor server 510 further includes a write module 516 (not shown) configured to enable a user to write to analysis module 512 to change a filter characteristics, such as the filter time constant or the filer type.

Figure 6:
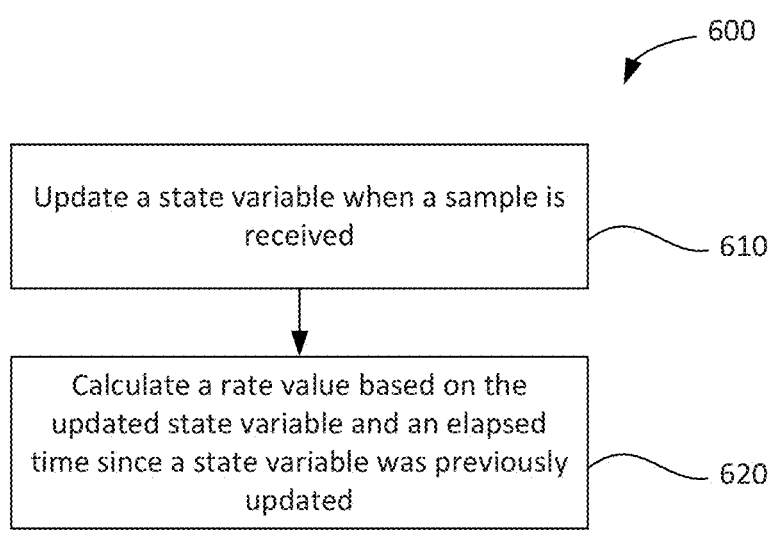
FIG. 6 is a flowchart diagram illustrating an exemplary method for calculating traffic rates based on random sampling performed by the network monitoring system of FIG. 5B.

FIG. 6 is a flowchart diagram illustrating an exemplary method 600 performed by a network monitoring system such as system 590 for calculating traffic rates based on random sampling, in accordance with an embodiment of the present invention. At 610, a packet transiting in a communications network may be sampled at a node (e.g., a monitor agent 520, 530, 540, 550 as shown in FIG. 5B), and a sample associated with the sampled packet is sent to a remote server (monitor server 510). The sampled packet can be a sampled data packet, a voice packet, a message packet, a control and management packet, and the like traversing across the communications network. When the sample is received at the server, a state variable is updated. The state variable can be a value associated with the packet. At 620, the method calculates a rate value based on the updated state variable and an elapsed time since the state variable was updated.

For steps 610-620, the following example illustrates how to update the state variable for a received sample and calculate a rate value. In an embodiment, a value v can be a variable associated with the packet, for example the size of the packet in bytes or the type of the packet (voice, message, data). The rate value r1 can be a function of the value v associated with a packet type, a scaling factor N based on the sampling probability, and a time scaling value dt according to Equation (1) (i.e., r1=v*N/dt) at a sampled time t1, as shown in FIG. 1. A rate value r2 is calculated at a late time t2 when the rate value is read (for example, by the monitor server 510). In an embodiment, the rate value r2 is calculated according to Equation (3), where a filter constant is defined as "a" and a number of sampling intervals between t1 and t2 is defined as "n". The number of sampling intervals between t1 and t2 can be calculated as (t2−t1)/dt, where dt is a time scaling value. The rate value is calculated using Equation (4), which may be a recursive low pass filter according to an embodiment of the present invention.

The method described above can be implemented in hardware, software, or firmware executed instructions stored in a computer readable storage medium according to some embodiments of the present invention.

Embodiments of the present invention provide a number of advantages over prior art methods of calculating rates associated with randomly sampled network packets. For example, according to some embodiments, calculations are only performed when state variables are updated as a sample is processed. In contrast, prior art approaches require every value to be updated in each interval. Embodiments of the present invention have low memory requirements: only the value of the state variable and the time that it was last updated needs to be stored. In contrast, prior art schemes require large sample sizes with corresponding large memory requirements. In addition, such processing also requires considerable processing resources and considerable processing time. According to embodiments of the present invention, the updated value can be used to drive actions at the instant it is updated, resulting in extremely low latency response to changing rates.

The computational efficiency, small memory footprint and low latency associated with this method of calculating rates makes the technique applicable to real-time control problems such as load balancing and denial of service mitigation where fast response greatly improves the effectiveness of the controls.

While the preferred embodiment uses a first order low pass filter, the technique can be applied to other types of filter. The preferred embodiment uses sFlow as the random packet sampling mechanism, but any other randomly sampling mechanisms will also work.

As would be apparent to those skilled in the art, the various functions of rate value calculations may be implemented with circuit elements or may also be implemented in the digital domain as processing steps in a software program. Such software program can be implemented in a digital signal processing unit, a general-purpose-processor, a network processor. The various functions may also be implemented with various modules of a processor. The present invention can also be implemented in the form of program code stored in a machine-readable storage medium such as hard drives, flash memory, ROMS, and the like.

The present invention is not limited to the above-described implementations. The invention is intended to cover all modifications and equivalents within the scope of the appended claims.

What is claimed is:

1. A method for calculating a traffic rate value at a node of a communications network based on random sampling, the communications network comprising an apparatus associated with the node and a monitor server coupled to the apparatus, the method comprising:
   generating a sample associated with a packet randomly sampled at the node by the apparatus;
   updating a state variable in response to the sample by the monitor server; and
   calculating, by the monitor server, the traffic rate value based on the updated state variable and an elapsed time since a state variable was previously updated, wherein the traffic rate value is a function of the updated state variable, a time scaling value, and a number of sampling intervals.

2. The method of claim 1, further comprising:
   sending the sample by the apparatus to the monitor server.

3. The method of claim 2, further comprising:
   storing the state variable and the traffic rate value in the monitor server.

4. The method of claim 1, wherein the number of sampling intervals is a function of the elapsed time and the time scaling value.

5. The method of claim 1, wherein calculating the traffic rate value comprises:
   performing a low pass filtering operation.

6. The method of claim 5, wherein the low pass filtering operation is performed using an infinite-impulse-response single-pole low pass filter.

7. The method of claim 1, wherein the sample comprises a value associated with a parameter of the packet.

8. The method of claim 7, wherein the parameter comprises a size or a type of the packet.

9. A method for calculating rates of incoming packets in a node of a network comprising a monitor server coupled to the node, the method comprising:
   sampling a first packet at the node;
   generating a first sample associated with the first packet at the node;
   receiving, by the monitor server, the first sample at a first sampling time from the node;
   updating, by the monitor server, a state variable based on the received first sample at a second sampling time; and
   calculating, by the monitor server, a rate value at the second sampling time based on the updated state variable, wherein the rate value is a function of the updated state variable, a time scaling value, and a number of sampling intervals.

10. The method of claim 9, wherein the second sampling time occurs at an irregular (random) interval from the first sampling time.

11. The method of claim 10, wherein the first sample is received with a sampling probability.

12. The method of claim 10, wherein calculating the rate value at the second sampling time comprises:
   updating the state variable according to an exponential decaying function having an exponential coefficient determined by a division of a difference between the first and second sampling times by a time scaling value.

13. A method for calculating a traffic rate of a network comprising an apparatus coupled to a monitor server, the method comprising:
   receiving a sample at a sampling time by the apparatus,
   updating a state variable in response to the received sample by the monitor server; and
   calculating, by the monitor server, the traffic rate while the state variable is being updated,
   wherein the traffic rate is a function of the updated state variable, a time scaling value, and a number of sampling intervals.

14. The method of claim 13, wherein calculating the traffic rate comprises:
   performing a single-pole recursive low-pass filter operation.

15. A network monitoring system comprising:
   an apparatus coupled to a network and configured to sample a packet transiting in the network and generate a sample associated with the sampled packet; and
   a monitor server coupled to the apparatus and configured to receive the sample at a first sampling time, update a state variable based on the received sample at a second sampling time, and calculate a rate value based on the updated state variable, wherein the rate value is a function of the updated state variable, a time scaling value, and a number of sampling intervals.

16. The network monitoring system of claim 15, wherein the rate value is calculated while the state variable is being updated at the second sampling time.

17. The network monitoring system of claim 15, wherein the rate value is calculated using a single-pole recursive low pass filter function.

18. The network monitoring system of claim 15, wherein the first and second sampling times occur at irregular time intervals.

* * * * *